United States Patent [19]

Tuot

[11] Patent Number: 4,520,033
[45] Date of Patent: May 28, 1985

[54] PROCESS FOR THE PREPARATION OF FOAMED AROMATIZATION CAPSULES AND THE CAPSULES PRODUCED THEREBY

[75] Inventor: James Tuot, Dublin, Ohio

[73] Assignee: Nestec, S.A., Vevey, Switzerland

[21] Appl. No.: 521,909

[22] Filed: Aug. 10, 1983

[51] Int. Cl.$^3$ .............................................. A23L 1/22
[52] U.S. Cl. ..................................... 426/96; 426/388; 426/594; 426/98; 426/289; 426/295; 426/470; 426/597; 426/650; 426/651; 426/589
[58] Field of Search ................... 426/388, 594, 96, 98, 426/289, 295, 470, 597, 650, 651, 589

[56] References Cited

U.S. PATENT DOCUMENTS

| 3,482,990 | 12/1969 | Pfluger et al. | 426/470 X |
| 3,821,436 | 6/1974 | Fry | 426/470 X |
| 3,903,295 | 9/1975 | Palmer | 426/96 X |
| 3,989,852 | 11/1976 | Palmer | 426/289 |
| 4,072,761 | 2/1978 | Margolis et al. | 426/594 X |
| 4,324,808 | 4/1982 | Wertheim et al. | 426/470 X |
| 4,389,422 | 6/1983 | Hudak | 426/651 X |

FOREIGN PATENT DOCUMENTS

| 984216 | 2/1976 | Canada | 426/470 |
| 0070719 | 1/1983 | European Pat. Off. | 426/98 |
| 0082459 | 6/1983 | European Pat. Off. | 426/98 |
| 2028093 | 3/1980 | United Kingdom | 426/594 |

*Primary Examiner*—Joseph Golian
*Attorney, Agent, or Firm*—Vogt & O'Donnell

[57] ABSTRACT

Processes for the production of foamed aromatization capsules containing aromatic constituents of food materials are disclosed. The foamed aromatization capsules produced by these processes are also disclosed. The capsules have improved aroma retention and are able to float on top of water so as to more effectively deliver the released aromatic constituents to the user.

23 Claims, No Drawings

PROCESS FOR THE PREPARATION OF FOAMED AROMATIZATION CAPSULES AND THE CAPSULES PRODUCED THEREBY

BACKGROUND OF THE INVENTION

1. Field of the Invention

This invention pertains to the field of food aromatization capsules and more specifically to foamed aromatization capsules. In particular, the present invention is concerned with the preparation of capsules having improved aroma retention and having improved means of delivering the retained aroma constituents to the user of the product in which these capsules are contained.

2. Description of the Prior Art

The desirability of retaining the flavor and/or aromatic constituents of food materials for a considerable length of time without their loss or deterioration has long been recognized.

In the preparation of instant coffee, for example, attempts have been made to incorporate the aroma principles of freshly roasted coffee by spraying them onto the surface of dried coffee extract as an emulsion with coffee oil. Careful sealing of the container for the aromatized dried coffee is required, however, to prevent escape of the aroma. After the container is opened, though, it is not too long before the aroma is lost in any event.

Encapsulation of aromatic constituents has also been investigated. Such an encapsulation technique is disclosed in U.S. Pat. No. 3,989,852 issued to Palmer.

Palmer prepares capsules by first forming a viscid, pasty core medium. This core medium contains the aromatic constituents to be encapsulated and has a tacky consistency which is somewhat akin to unhardened fudge with only a very small percentage of liquid contained therein. This core is then added to an agitated film-forming agent which adheres to the core medium to form the capsules.

This and similar techniques may suffer from a number of disadvantages. The amount of encapsulated aroma in such a technique is rather low and thus undesirably necessitates the addition of a relatively high proportion of such capsules to the host product which is to be aromatized. Moreover, these capsules do not retain the aromatic constituents for a considerable length of time when placed in the host product. This loss of aroma may be attributable to the final capsule structure which is generally comprised of a continuous solid phase throughout the capsules without there being any clearly defined capsule wall or shell to help retain the aroma within the capsules.

Most importantly, however, when water is added to the host product containing such capsules so as to reconstitute the same as in, for example, instant coffee, instant tea, instant soup, etc., the aromatic constituents contained within these capsules are generally not released from the reconstituted product immediately, so that the consumer does not perceive a burst of aroma when these capsules rupture and dissolve. Instead, due to the very large ratio of water employed in comparison to the amount of aromatic constituents contained within the capsules and because the capsules generally tend to sink to the bottom, the major portion of the aroma is simply dissolved in the water without ever leaving the cup. The concentration of the aromatic constituents is generally such that practically none of these constituents are present in the vapor phase at the surface of the cup in a concentration which is sufficient to produce an aroma which the consumer can immediately sense as in-cup aroma.

SUMMARY OF THE INVENTION

Applicant has discovered a new aromatization capsule which avoids substantially all of the disadvantages associated with the prior art discussed above.

The aromatization capsules can be stored in a host material for a considerable length of time and can be stored alone practically indefinitely without any substantial loss or deterioration of the aromatic constituents contained therein.

Moreover, the capsules of the present invention contain a large quantity of encapsulated aroma such that a correspondingly lesser amount of these capsules is required in order to obtain a particular aromatizing effect. Still further, on contact with a suitable liquid, the capsules, while being dissolved, release the encapsulated aroma directly to the consumer over a period of time by being able to float on the surface without the aroma being "lost" in the body of the liquid.

Applicant has discovered that by foaming a core mixture containing an aqueous essence and a water-soluble powdered edible solid and then adding this foamed mixture in the form of droplets to a wall material of water-soluble edible solids which is being agitated, capsules are formed which upon curing have all of the above-noted desirable properties.

More particularly, the present invention for producing aromatization capsules which have a long shelf-life, have improved aroma release and which permit the encapsulation of large amounts of aroma comprises the steps of mixing an aqueous essence containing aromatic constituents with a water-soluble powdered edible solid to form a core mixture, which is then converted into a foam by injection of a gas. Preferably, the mixture is cooled to a temperature near its freezing point prior to being foamed. The foamed mixture is then added in the form of droplets to a wall material of water-soluble powdered edible solids while the said wall material is being agitated to cause a water flux from the foam droplet to the surrounding wall material to form coated particles. Each such coated particle consists of a continuous layer of the wall material surrounding a foam droplet. The coated particles are then cured by continuing agitation of the wall material until the surrounding layer of the wall material about the coated particles forms a continuous hardened shell surrounding a honeycombed structured core containing the entrapped aromatic and/or flavor constituents. In a preferred embodiment, the core mixture additionally contains an edible oil.

For convenience, the term "droplet" is used throughout this disclosure to refer to subdivided portions of the foam having a diameter as small as 300 to 400 μm or as large as 1.0 to 1.5 mm, regardless of how the foam is actually subdivided.

While the principles of the present invention may be employed for the encapsulation of aromatic constituents of essentially any food material employing various wall materials, this invention is particularly applicable to the preparation of coffee or tea capsules in which all of the materials utilized in making these capsules are derived exclusively from either coffee or tea, respectively, so as to avoid the incorporation of foreign material in the host coffee or tea product.

Foaming of the core material provides at least three advantages. First and foremost, by foaming the core material, capsules are produced which have a low density so that they are able to float at the surface of the liquid employed for reconstitution and thereby more effectively deliver the released aroma directly to the consumer. Second, the foaming of the core material also produces a continuous honeycombed structure within the core of the finished capsule. This honeycombed structure provides for better aroma retention by creating a multitude of enclosed pockets containing the aromatic constituents within a continuous hardened, glassy-like wall of the capsule. Third, the foaming significantly decreases the amount of curing time.

Capsules prepared by the process of the present invention may have a diameter ranging from about 150 μm to 3 mm and a wall thickness in the range of from about 25 to 250 μm.

DETAILED DESCRIPTION OF THE INVENTION

The process of the present invention is carried out by first forming a core mixture.

The core mixture is generally prepared by mixing an aqueous essence containing aromatic and/or flavor constituents with a water-soluble powdered edible solid. If desired, an edible oil may optionally be added to the core mixture. Advantages of employing an oil, aside from any additional aromatic constituents that it may contain, are its ability to further improve aroma retention, decrease the possibility of oxidation reactions, and to aid in delivering the aromatics to the user when the capsule structure is destroyed.

The aromatic constituents present in the aqueous essence, after capsule formation, will generally be found both within the walls of the honeycombed interior structure and in the capsule shell itself. When an oil is employed, however, a large proportion of these aromatic constituents will also be present in the oil which is dispersed throughout the honeycombed structure as a layer upon the inner walls thereof. Inasmuch as the oil, upon its release from the capsule during reconstitution of the host product, will naturally float, it will carry the aromatic constituents with it to the surface thus providing rapid delivery of the aroma to the user.

The aqueous essence of the present invention may comprise flavorants and/or aromatics derived from fruit, meat, seafood, spices, vegetables, etc. In particular, distillates of coffee, tea, chocolate, etc., may be employed. So, too, the flavor and/or aromatic principles, both natural and/or artificial, of chicken, shrimp, fish, ham, lobster, leek, onions, carrots, bacon, roast beef, etc. are also applicable in the process of the present invention.

The water-soluble edible solid that is mixed with the aqueous essence to form the core mixture may also be the same material as is used to form the hardened, continuous, substantially impervious shell or wall of the finished capsules. Such materials include, but are not limited to, instant coffee solids, instant tea solids, powdered instant chicory, protein based materials such as gelatin, pectin, etc., and non-protein based materials such as guar gum, gum arabic, etc.

The powdered edible solid material should be readily soluble in water. This characteristic is important not only for facilitating easy release of the encapsulated flavor and/or aromatic principles, but is also important to the formation of the capsule itself. Furthermore, the powdered edible solid materials should also have the property, after being wetted and dried, of forming a glassy-like structure thereby forming substantially impervious walls. These powdered edible solids may be employed alone or as mixtures depending upon the particular end use intended for the capsules.

The edible oil that may optionally be employed in the process of the present invention may be obtained from a variety of different sources. Such oils include, but are not limited to, coffee oil, safflower oil, peanut oil, corn oil, cottonseed oil, and oils derived from other vegetable sources. So, too, oils derived from animal fractions such as fowl, beef, pork, fish, etc., may also be employed. Fully or partially hydrogenated oils may also be employed. The oils may be employed alone or in combination with one another. If desirable, the edible oil may also be aromatized. The employment of a particuar oil having a specific melting point will generally be dictated by the specific end use intended for the capsules employing such oil.

The amount of water-soluble powdered edible solids employed in making the core mixture is an important criterion for making the capsules of the present invention. The lower limit is generally dictated by the necessity of having sufficient solids to provide the lattice or honeycomb structure of the finished capsule. This lower limit has been found to be about 20% by weight based on the weight of the core mixture. The upper limit is set by practical considerations; the higher the solids content, the more difficult it is to mix, handle and spray the resulting mixture. Thus, about 60% by weight of the core mixture is believed to be a practical upper limit. The more preferred range of solids is about 25% to 45% by weight.

The aqueous essence, such as aqueous coffee distillate, may be present in the core mixture in a range of from about 15% to 80% by weight and more preferably in the range of from about 40% to 70% by weight. The amount employed will generally depend upon the strength of the essence and the desired amount of aromatization to be imparted. If the level of aqueous essence present is too low then there will not be sufficient moisture to dissolve enough of the wall material to which the core mixture is subsequently added which hardens to form the capsule walls. At very high levels of aqueous essence, however, there will be insufficient solid material for the formation of the interior honeycomb structure.

The edible oil can be present in an amount of from 0% to 25% by weight, and preferably is in the range of from about 10% to 20% by weight. The upper limit is generally dictated by the amount of oil which may be present in the host product. In some products, an excessive amount of oil can create an unsightly appearance on reconstitution. In other products, such as instant soup where the presence of oil is not objectionable, a higher amount of oil may be employed.

The constituents of the core mixture are thoroughly mixed together by any conventional means well known to those skilled in the art. Generally, the mixture will be mixed by means of a homogenizer.

After the core mixture has been formed, it is then foamed. Foaming is carried out by the injection of a non-toxic gas into the core mixture. The gas may be introduced directly into the line carrying the core mixture. Alternatively, the core mixture may be conveyed to a vessel in which the foaming gas is introduced. Other suitable means for foaming the core mixture which are well known to those skilled in the art may also be used. Gases such as nitrogen, carbon dioxide, nitrous oxide, etc., are all applicable, alone or in combination. If desired, aromatic gases such as grinder gases derived from the grinding of roast coffee or draw-off gases evolved during coffee extraction, etc., may also be employed as the means by which the core mixture is foamed. The use of such aromatic gases enhances the organoleptic qualities of the resulting capsules. Inert gases are particularly desirable so as to reduce the possibility of oxidation reactions.

In order to obtain the desired objectives of having the capsules float and simultaneously provide an internal honeycombed structure, it has been found that the core mixture should be foamed to an overrun of from about 17% to 100% and preferably about 25% to 35% so that the resulting foam has a density within the range of from about 0.80 to 0.90 gm/cc.

Preferably, the foaming is carried out on the core mixture after or while it is being cooled from ambient temperature to a temperature near its freezing point, which is usually in the range of from about $-5°$ to $-2°$ C. depending upon the nature and amounts of the particular constituents. Thus, the foaming gas can be introduced into the core mixture just as it enters a suitable heat exchanger to cool it to the desired temperature. Alternatively, the mixture may first be cooled and then subjected to the foaming step. Cooling the mixture before or during the introduction of the gas for foaming facilitates the foaming operation.

The cooled foam is then desirably passed through a mixer such as a high shear agitator so that it may be thoroughly homogenized. If desired, the foam may then be recirculated back to the point at which the gas is introduced to the core mixture and then passed once again through the heat exchanger and homogenizer until the desired amount of foaming and/or cooling has been obtained.

The foamed mixture is then added to a wall material of water-soluble powdered edible solids in the form of droplets while the wall material is being agitated.

The foamed core mixture may be subdivided into droplets by any suitable means well known in the art such as by spraying the mixture through a nozzle under pressure onto the agitated powdered wall material. Other similar techniques may also be employed. The droplets should preferably be in the range of from about 600 $\mu$m to 1.0 mm in size.

In the spraying technique, which is the preferred embodiment for adding the foamed core mixture to the wall material, a spray pressure of about 1.05 to 1.40 kgs/cm$^2$ is desirable when employing a solid-stream jet nozzle, the temperature of the foam sprayed being usually approximately 4° to 10° C. While these ranges are preferred, they are not critical. The foamed mixture can be sprayed at any temperature up to about 15° C. without detriment to the structure of the capsules or aroma retention. There is, however, a slight advantage in aroma retention when the spraying temperature is kept low. Generally, the nozzle orifice employed when spraying the foam mixture will have an opening in the range of from about 0.2 to 0.5 mm.

As noted earlier, the wall material of water-soluble edible solids may be the same material as is employed in forming the core mixture. Thus, fine instant coffee solids, instant tea solids, etc., may be employed. Generally, the wall material should have a particle size in the range of from about 40 to 100 $\mu$m. The wall material is preferably agitated by being placed in a rotary drum or tumbler, but may be agitated by any conventional means well known to those skilled in the art.

An important parameter of the wall material is its starting moisture content and the moisture content at which it begins to cake. In making the capsules of the present invention, caking should be avoided. Thus, the amount of foamed core mixture added to the wall material should be such that the increase in moisture content of the wall material does not reach the moisture content at which caking occurs.

For fine coffee powder, caking starts under static conditions at a moisture level of about 6% to 7% by weight. Under dynamic conditions, caking starts at about 9% moisture. Since fine instant coffee powder will generally have a moisture content of about 1.5 to 3% by weight, in order to insure that caking does not result, the amount of foamed mixture added to the wall material should be such that the increase in moisture content of the wall material is generally no more than about 3% to 5% by weight.

However, if the foamed core mixture is added to the wall material in an amount which corresponds to a moisture increase of the wall material much less than 3% to 5% by weight, the capsule formation is somewhat altered with the shape of the capsules not always being spherical. Such irregularly shaped capsules are undesirable inasmuch as the wall at the change of curvature might be fragile and thinner than that of regularly formed spherical capsules. Accordingly, the best results for the production of coffee capsules, for example, are obtained when the amount of foamed core mixture sprayed results in a final moisture content of the system (wall material/core formulation) being in the range of about 6 to 7% by weight.

Generally speaking, however, the ratio of the amount of foamed core mixture added to the powdered wall material is in the range of from about 1:9 to 1:15.

The temperature of the wall material has not been found to be an important parameter over the range of $-40°$ C. to 50° C. Accordingly, for practical considerations, the temperature may desirably be at ambient conditions.

After the foamed core mixture has been added to the agitated wall material, water from the aqueous portion of each droplet of foam diffuses outwardly from the droplet to the surrounding wall material causing a water flux. The wetted wall material then adheres to the surface of the foam droplet forming a coated particle, each such coated particle having a continuous layer of the wall material surrounding a foam droplet core. The capsules are then cured by maintaining the capsules in contact with the wall material until the structural integrity of the capsules is assured. Generally, curing is carried out by continuing the agitation of the wall material for at least 5 to 15 minutes. Longer curing times may also be employed. Curing is complete when the capsules are capable of being removed from the wall material without agglomeration.

After curing, the capsules are well formed, having a continuous, hardened shell surrounding a honeycombed structured core containing the aromatic constituents. The capsules may then be easily separated from the wall material by means of, for example, sifting. However, the moisture level of these capsules may be on the high side, generally in the order of about 8 to 10% by weight. Accordingly, to further reduce the moisture level, the capsules may be further maintained within the wall material for a sufficient period of time, for example, 24 to 48 hours. Alternatively, the capsules, alone or in combination with the wall material, may be dried on a fluidized bed or any other conventional drying apparatus. When a fluidized bed is employed, an increase in gas flow rate of the fluidizing medium is sufficient to entrain the powdered wall material so as to separate the capsules therefrom while still in the drier instead of having to subsequently sift the capsules from the powder.

Depending upon the particular composition of the capsules produced, they will have a final bulk density of about 0.2 to 0.6 gm/cc. For capsules made entirely from coffee derived constituents, the bulk density of such capsules is in the range of from about 0.23 to 0.45 gm/cc.

It has been found that the presence of some oil in the wall material prior to the spraying of the foamed core mixture results in capsules having a thicker surrounding wall which in turn further aids in aroma retention. Generally, these capsules have a wall thickness in the range of about 200 to 250 $\mu$m. In a continuous process in which the wall material is recycled, because not all of the oil contained within the core formulation is encapsulated, the oil content of the wall material builds up with time until a steady state is reached at which time the oil content is generally about 5% by weight. Accordingly, in one embodiment of the present invention, the foamed core mixture is sprayed into such a recycled wall material (or alternatively, into a wall material to which 5% by weight of oil is added) so that thicker wall capsules are provided. Such capsules preferably have a diameter of from about 0.8 to 1.0 mm. It has been found that these smaller capsules having thicker walls retain more aromatics and dissolve more readily than corresponding larger capsules.

Gas chromatographic analysis has shown that at least 90%, and usually 95%, of the aromatic constituents contained in the core mixture are found in the finished capsules. So, too, it has also been determined that the aromatic constituents entrapped within the capsules of the present invention generally do not undergo deterioration with time.

As to the amount of aroma retained with time, it has been found that when the capsules are stored by themselves, essentially no aroma is lost. However, when the capsules are blended with a host product, such as coffee capsules being blended with instant coffee, a concentration gradient exists between the capsules and the host product and with time, some of the aroma will diffuse out from the capsules.

For evaluating aroma retention, capsules were prepared containing nine compounds commonly found in coffee aroma which were selected to cover a wide range of chemical function and boiling points. Except for ethyl mercaptan which would not dissolve in the solution, an equimolar solution of the various compounds was prepared. The particular compounds employed, their respective boiling points and their molar composition is set forth in Table I below:

TABLE I

| CHEMICAL COMPONENTS | BOILING POINT (°C.) | MOLAR COMPOSITION |
| --- | --- | --- |
| ETHYL MERCAPTAN | 35 | .0141 |
| ETHYL ACETATE | 77 | .1408 |
| METHYL ETHYL KETONE | 80 | .1408 |
| THIOPHENE | 84 | .1408 |
| PYRIDINE | 115 | .1408 |
| OCTANE | 126 | .1408 |

TABLE I-continued

| CHEMICAL COMPONENTS | BOILING POINT (°C.) | MOLAR COMPOSITION |
| --- | --- | --- |
| 1 - HEXANOL | 157 | .1408 |
| FURFURAL | 162 | .1408 |

To 570.8 grams of the chemical solution (566.23 g water +4.56 g chemicals) were added 335.1 grams of coffee solids and 94.1 grams of coffee oil to provide a core mixture totalling 1,000 grams. After the mixture was foamed and sprayed into a bed of agitated instant coffee solids in accordance with the present invention, 1245.38 grams of capsules were recovered with the following composition:

```
335.10 grams of coffee solids sprayed
 90.94 grams of water and aroma
 69.24 grams of oil
746.14 grams of solids "picked up" as a
       result of the process
```

Accordingly, based on a mass balance, the capsules contained on the average 3.67 milligrams of chemicals per gram of capsules. A gas chromatographic analysis showed a level of 3.313 milligrams of chemicals per gram of capsules indicating an aroma trapping of 90.37%.

The capsules were stored in coffee powder for a total of 59 weeks. Capsules were analyzed by means of gas chromatographic headspace analysis to determine the amount of aromatics contained as a function of time, the results of which are set forth in Table II below:

TABLE II

OVERALL AROMA RETENTION
GC HEADSPACE ANALYSIS
$\mu$g/g capsules - CORRECTED FOR WATER

| ELAPSED TIME | % H$_2$O | TOTALS | H$_2$O FREE | % RETAINED |
| --- | --- | --- | --- | --- |
| 1 Day | 7.55 | 3364 | 3639 | |
| 2 Days | 7.62 | 3305 | 3578 | 98 |
| 3 Days | 6.95 | 3349 | 3599 | 99 |
| 1 Week | 5.76 | 3353 | 3558 | 98 |
| 2 Weeks | 5.08 | 3007 | 3168 | 87 |
| 3 Weeks | 5.16 | 2414 | 2546 | 70 |
| 4 Weeks | 4.76 | 2275 | 2389 | 66 |
| 6 Weeks | 5.06 | 2076 | 2191 | 60 |
| 8 Weeks | 4.58 | 2086 | 2189 | 60 |
| 12 Weeks | 4.85 | 2084 | 2190 | 60 |
| 26 Weeks | 4.40 | 1182 | 1231 | 34 |
| 39 Weeks | 3.85 | 1601 | 1665 | 46 |
| 59 Weeks | 4.10 | 1747 | 1822 | 50 |

As is seen from the above Table, the moisture equilibrates very quickly between the capsules and the host powder. After only one day, the difference is only 1% or less. Most importantly, it is seen that the compounds were lost only gradually with time. After 6 weeks the retention is about 60% and from then on decreases very slowly to a value of 50% after 59 weeks.

A second storage test was also carried out with coffee capsules. In this storage test, the effect of temperature was also studied.

Coffee capsules were prepared according to the present invention having the following core composition which was sprayed into fine instant coffee solids:

```
58% instant coffee solids
33% aqueous coffee distillate
```

-continued

| 9% coffee oil |
|---|

The coffee capsules were mixed with a host powder consisting of instant coffee and portions thereof were stored in a freezer at a temperature of −15° C. at ambient temperature and at a temperature of 38° C. The amount of aroma retained within the capsules was determined by gas chromatographic analysis with headspace or Tenax techniques. Such chromatographic techniques are well known to those skilled in the art and are described in, for example, CHROMATOGRAPHIA, 6, 67 (1973) by A. Zlatkis, M. A. Lichtenstein and A. Tishbee, the contents of which are incorporated herein by reference. The results of both of these analyses as to the aroma retention for the coffee capsules are set forth in Table III below:

TABLE III

| | OVERALL % AROMA RETENTION | | |
|---|---|---|---|
| ELAPSED TIME | FREEZER (−15° C.) | AMBIENT | 38° C. |
| A. GC HEADSPACE ANALYSIS | | | |
| Start | 100% | 100% | 100% |
| 2 Weeks | 120 | 105 | 78 |
| 1 Month | 110 | 118 | 60 |
| 2 Months | 105 | 85 | 59 |
| 3 Months | 103 | 63 | 46 |
| 4 Months | 108 | 68 | 48 |
| 5 Months | 101 | 70 | 34 |
| 6 Months | 115 | 68 | 36 |
| B. TENAX PROCEDURE (WITH SWEEP) | | | |
| Start | 100% | 100% | 100% |
| 2 Weeks | 102 | 90 | 82 |
| 1 Month | 123 | 100 | 74 |
| 2 Months | 91 | 77 | 48 |
| 3 Months | 88 | 63 | 58 |
| 4 Months | 85 | 62 | 33 |
| 5 Months | 91 | 49 | 29 |
| 6 Months | 118 | 56 | 31 |

From the analyses, it is seen that aroma retention is affected by storage temperature. When kept in a freezer, essentially all of the aroma is retained with time. At room temperature, the values found with the coffee capsules were in the same order of magnitude as that found with the compounds set forth in Table II, i.e., stabilization of around 60% occurs after about 3 months and thereafter, only a very slight decrease of aroma occurs with time. At 38° C., aroma losses are more pronounced. After 6 months, the aroma retention is only about 30% of the original aroma. However, it is noted that storage at 38° C. is equivalent to at least 2 or 3 times a storage period at room temperature.

Generally, the amount of capsules added to a food product can vary from as little as 0.1% to as much as 10% by weight. The amount of capsules added to a particular product will generally depend upon the desired level of flavoring and/or aroma that is to be imparted and the flavor and/or aromatic strength of the particular capsules.

With coffee, for example, up to 5% of the final product can be comprised of coffee capsules made from 100% coffee materials with no obvious detection. Typically, however, the level of coffee capsule incorporation will vary from 0.5% to 2.0% by weight.

In the preparation of other instant foods, for example, instant soup, the capsules containing the flavor and/or aromatic constituents of vegetables and the like may be added to such instant food by dry mixing. Generally, the amount of aromatization capsules added to such an instant food product will be in the order of about 0.2% to 10.0% by weight.

An intact capsule produced by the present invention will have essentially no aroma of its own. It is not until the capsule structure is destroyed, as by contact with a liquid or by crushing, that a large burst of aroma is given off and effectively delivered to the user of the product by the ability of these capsules to float on top of the reconstituted product. Depending upon the particular wall material employed, the wall thickness, the size of the capsule and the temperature of the liquid, the dissolution of the capsules may take anywhere in the range of from about 2 seconds to 2 minutes.

Having described the basic concepts of this invention, the following Examples are set forth to illustrate the same. They are not, however, to be construed as limiting the invention in any manner. In the Examples, ratios and percentages are given by weight.

EXAMPLE 1

A core formulation is prepared having the following composition:

| Aqueous coffee distillate | 3.28 kgs | 52% |
|---|---|---|
| Instant coffee solids | 2.12 kgs | 33% |
| Coffee oil | .95 kgs | 15% |
| TOTAL | 6.35 kgs | 100% |

The core constituents are combined, homogenized and stored in a feed tank.

A pump circulates the mixture into a scraped-surface heat exchanger whose shell is kept at a temperature of about −15° C. The temperature of the mixture leaving the heat exchanger is about −5.5° C. which corresponds to the freezing point of the mixture. The pressure ahead of the scraped-surface heat exchanger is maintained at about 2.8 kgs/cm$^2$.

Foaming of the mixture is achieved by injecting nitrogen in the feed line to the scraped surface heat exchanger at the rate of 0.006 standard cubic meters per hour at 3.5 kgs/cm$^2$, a rate which is sufficient to produce a foam having a density of 0.82 gm/cc; corresponding to an overrun of 33%.

An in-line homogenizer is employed immediately after the scraped-surface heat exchanger to insure a consistent homogenous foamed mixture. The temperature of the foamed mixture after passing through the homogenizer is about 1.6° C.

The cooled foamed mixture having a temperature of 1.7° C. is then sprayed through a spraying nozzle having a 0.48 mm orifice with a spraying pressure of 1.4 kg/cm$^2$ and at a rate of 30 grams/minute. A total of 1186 grams of the foamed mixture are sprayed into a rotating drum containing freeze-dried instant coffee powder (moisture content: 1.9%; particle size: 40 to 100 μm), as measured by weighing the drum before and after spraying. A total of 14.5 kilograms of the freeze-dried coffee powder is employed as the wall material.

The ratio of sprayed mixture to the amount of wall material employed is 1186 grams/14515 grams or 0.0817. Considering the theoretical increase in moisture content of the wall material, assuming equilibrium between the capsules and the powder, the value is calculated as (1186 grams×52% water contained in mixture)/(1186+14515)=0.0397 or 3.97% moisture increase.

After all of the core mixture has been sprayed into the wall material, the agitation is continued for an additional 10 minutes to cure the resulting capsules. Both the capsules and the coffee powder are then discharged into plastic bags and left for 3 days at room temperature. 100% coffee capsules are then collected from the powder by means of sifting.

The coffee capsules produced have an average particle size of from 0.8 to 1.8 mm and a bulk density of about 0.4 gms/cc.

The capsules are incorporated into an instant coffee in an amount of 1.4% by weight. Upon the addition of hot water, the capsules float on top of the coffee brew and release a burst of coffee flavor and aroma.

EXAMPLE 2

The procedure and materials set forth in Example 1 are repeated with the only exceptions being that the core formulation is foamed to a 54% overrun and instead of spraying the foamed core mixture onto the wall material, the capsules are prepared by adding droplets of the foam onto the coffee powder. 9.22 gms of the cold, foamed mixture is dropped at 7.2° C. onto 227 gms of fine instant coffee powder kept in a beaker at ambient temperature using a pipet having an opening of about 0.7 mm. After the addition of each droplet, the beaker is well stirred to simulate a tumbling action. After curing for 48 hours by allowing the capsules to be in contact with the coffee powder in the beaker, 8.43 gms of capsules are sifted from the powder. The capsules produced in this example appear and behave similarly to the capsules prepared in Example 1 with the exceptions that the capsule size is in the range of from about 2.0 to 5.0 mm and the bulk density is about 0.37 gms/cc.

EXAMPLE 3

The procedure of Example 1 is repeated with the exception that instead of drying the capsules by storing them with the powder in plastic bags for a number of days, the entire mixture of powder and capsules is introduced into a mechanically vibrated fluidized bed drier. The air temperature of the fluidized air bed is maintained at approximately 50° C. with an air flow rate of approximately 0.5 meter per second. After 10 minutes in the fluidized air bed, the capsules are removed by increasing the air flow rate to approximately 1.67 meters per second such that the excess powder is blown out leaving the cured fully formed and dried capsules behind.

EXAMPLE 4

Example 1 is repeated with the only exception being that aromatic gases, particularly grinder gases, are employed instead of nitrogen to foam the core mixture. The capsules produced in this Example appear and behave similarly to those prepared in Example 1 but release a somewhat stronger burst of aroma when ruptured and significantly increase the in-cup taste of the coffee brew.

EXAMPLE 5

A core formulation is prepared without any oil being present and has the following composition:

| Aqueous coffee distillate | 69% |
|---|---|
| Instant coffee solids | 31% |

After the core mixture is foamed to an 18% overrun in a manner similar to that set forth in Example 1, 180 grams of the foamed mixture are sprayed at 9° C. using a 0.48 mm orifice full stream liquid nozzle at 3.0 kg/cm$^2$ absolute pressure into 2267 grams of instant coffee powder tumbling in a rotary drum at 14 RPM. After 2 minutes of tumbling, the capsules are maintained in contact with the instant coffee powder for an additional 24 hours. 324 grams of capsules having a moisture content of 9.4% are recovered. The capsules are able to float on top of an aqueous brew as they dissolve thereby releasing the entrapped aroma directly to the user.

Storage of the capsules at 38° C. for one week results in an aroma recovery of 82%.

EXAMPLE 6

Tea capsules are prepared using the following core composition:

| Aqueous tea distillate | 66.6% |
|---|---|
| Soluble tea solids | 33.83% |

28 grams of the core composition are cooled to a temperature of −6° C. and foamed to a 46% overrun. The foam mixture is then sprayed with a 0.3 mm orifice solid stream nozzle at −4° C. at 2.9 kg/cm$^2$ absolute pressure onto 907 grams of agitated fine soluble tea powder having a moisture content of about 3%. 75.4 grams of capsules having a moisture content of 7.72% are recovered by sifting 48 hours after spraying.

Examination of these capsules reveals a honeycomb structure surrounded by a glassy wall. Upon dissolution of the capsules in a hot aqueous tea brew, a pleasant, potent tea aroma is released as the capsules float on the surface and the in-cup flavor improved.

EXAMPLE 7

Orange essential oil capsules are prepared employing a core formulation as follows:

| Water | 61.4% |
|---|---|
| Orange peel oil | 12.3% |
| MALTRIN 040 (modified corn syrup solids) | 26.3% |

This core mixture is cooled to 10° C. and pressurized with carbon dioxide to an absolute pressure of 6.1 Kg/cm$^2$. 645 grams of the mixture are then sprayed with a 0.22 mm orifice solid stream liquid nozzle into 6804 grams of wall material consisting of 75% MALTRIN M-100 and 25% FRODEX 24 (modified corn syrup solids) which is being tumbled at ambient temperature at 15 RPM. Curing and drying are carried out at 60° C. for 30 minutes in a fluidized bed. An analytical determination discloses that 90% of the essential oil is encapsulated.

EXAMPLE 8

Capsules are prepared employing instant chicory as the wall material and aqueous coffee distillate as the source for the aroma. The core formulation is comprised of the following:

| Aqueous coffee distillate | 52% |
|---|---|
| Instant chicory powder | 33% |

| Coffee oil | 15% |

170 grams of foamed core material (25% overrun) is sprayed at 5° C. using a 0.3 mm orifice full stream liquid nozzle at 3.0 kg/cm² absolute pressure into 2267 grams of fine chicory powder which is being tumbled at 17 RPM. After curing for 7 minutes by additional tumbling, the capsules are then dried by being left in the chicory powder for 48 hours.

415 grams of capsules are recovered having a particle size in the range of 0.84 to 1.68 mm. These capsules dissolve within one minute in hot water as they float, releasing a pleasant coffee aroma. Examination of these capsules reveal a very thick glazed wall and a honeycomb core stucture.

EXAMPLE 9 (COMPARATIVE EXAMPLE)

A. Uniformed Core (Not In Accordance With Present Invention)

A core formulation was prepared from the following:

| Aqueous coffee distillate | 57% |
| Instant coffee powder | 33% |
| Coffee oil | 10% |

In this comparative example, which is not in accordance with the present invention, the core mixture is not foamed. 290 grams of this core mixture are sprayed at 3.0 kg/cm² absolute pressure at 10° C. through a 0.48 mm orifice solid stream nozzle into 2267 grams of fine soluble coffee powder which is being tumbled at 34 RPM. After 2 minutes of tumbling, the capsules are maintained in contact with the coffee powder for an additional 24 hours.

273 grams of capsules having a moisture content of 8.6% moisture, 3.9% total oil and a particle size of 0.52 mm to 3.07 mm are collected.

These capsules have a plain, solid structure throughout without a honeycomb core center. As a result, these capsules, when added to a cup of hot water, do not float or release any appreciable quantity of aroma.

After storage at 38° C. for one week, aroma recovery is found to be 55%.

B. Formed Core (In Accordance With Present Invention)

In comparison, the same core material used in part A of this Example is foamed in accordance with the present invention to an overrun of 27%.

266 grams of this foamed core mixture are then sprayed at 3.0 kg/cm² absolute pressure at 10° C. through a 0.48 mm orifice opening solid stream liquid nozzle into 2267 grams of fine soluble coffee powder being tumbled at 34 RPM as in part A of this Example. Once again, the capsules are tumbled for an additional 2 minutes and then maintained in contact with the coffee powder for 24 hours.

246 grams of capsules having a particle size of from 1.02 mm to 2.54 mm, 8.3% moisture and 8.06% total oil are recovered by sifting.

Examination of these capsules reveals a honeycomb core structure surrounded by a solid, continuous glazed wall. These capsules are able to float on top of hot water and release an initial burst of coffee aroma and continue to release aroma directly to the consumer as they are being dissolved.

After one week of storing at 38° C., the aromatic recovery is found to be 81%, a difference of 26% as compared to the unfoamed capsules of part A of this Example.

I claim:

1. A process for producing foamed aromatization capsules capable of floating at the surface of an aqueous medium comprising the steps of:
   (a) mixing an aqueous essence containing aromatic constituents with a water-soluble powdered edible solid to form a core mixture;
   (b) foaming the core mixture by the injection of gas into said mixture to provide a foam;
   (c) adding the foamed mixture in the form of droplets to a wall material of water-soluble powdered edible solids while the said wall material is being agitated to cause a water flux from the foam droplets to the surrounding wall material and form coated particles, each such coated particle having a continuous layer of said wall material surrounding a foam droplet;
   (d) curing the coated particles by continuing agitation of the wall material until the surrounding layer of wall material about the coated particles forms a continuous, hardened shell surrounding a honeycombed structure core containing the aromatic constituents; and then
   (e) collecting the resulting capsules.

2. The process of claim 1, wherein the core mixture additionally contains an edible oil.

3. The process of claim 1, wherein the core mixture contains from about 20% to about 60% by weight of the powdered edible solid, from about 15% to 80% by weight of the aqueous essence and from about 0 to 25% by weight of edible oil.

4. The process of claim 3, wherein the aqueous essence is coffee distillate or tea distillate.

5. The process of claim 3, wherein the powdered edible solid is instant coffee or instant tea.

6. The process of claim 3, wherein the edible oil is coffee oil.

7. The process of claim 1, wherein the core mixture is foamed to an overrun of about 17% to 100%.

8. The process of claim 1, wherein the foam has a density of between about 0.80 to 0.90 gm/cc.

9. The process of claim 1, wherein the gas is selected from the group consisting of carbon dioxide, nitrous oxide, nitrogen, grinder gas and draw-off gas.

10. The process of claim 1, wherein the foamed mixture is sprayed onto the agitated wall material.

11. The process of claim 1, wherein the wall material is instant coffee powder or instant tea powder and has a particle size in the range of from 40 to 100 μm.

12. The process of claim 1, wherein the moisture content of the wall material is about 1.5% to 3.0% by weight.

13. The process of claim 1, wherein the amount of foamed core mixture added to the wall material is such that the moisture content of the wall material increases by about 3% to 5% by weight.

14. The process of claim 1, wherein the foamed core mixture is added to the wall material in a ratio of from 1:9 to 1:15 by weight of foam to wall material.

15. The process of claim 1, wherein the capsules have a bulk density in the range of from about 0.2 gm/cc to 0.6 gm/cc.

16. The process of claim 1, which includes a drying step subsequent to the curing step.

17. The foamed aromatization capsules produced by the process of claim 1.

18. Aromatization capsules capable of floating at the surface of an aqueous medium comprising a hardened continuous shell of a water-soluble edible food material surrounding a core having a honeycombed hardened foam structure containing aromatic constituents.

19. The capsules of claim 18, having a particle size of from 150 µm to 3 mm.

20. The capsules of claim 18, having a bulk density of from 0.2 to 0.6 gm/cc such that they float on water.

21. The capsules of claim 18, having a wall thickness of from 25 to 250 µm.

22. The capsules of claim 18 also containing an aromatized oil in the honeycombed structure.

23. The capsules of claim 18, wherein the shell is comprised of instant coffee solids and surrounds a core having a honeycombed structure comprised of instant coffee solids containing coffee aroma.

* * * * *

UNITED STATES PATENT AND TRADEMARK OFFICE
CERTIFICATE OF CORRECTION

PATENT NO. : 4,520,033
DATED : May 28, 1985
INVENTOR(S) : James Tuot

It is certified that error appears in the above—identified patent and that said Letters Patent is hereby corrected as shown below:

Column 13, line 20, "Uniformed" should read --Unfoamed--.

Column 13, line 49, "Formed" should read --Foamed--.

Signed and Sealed this

Thirteenth Day of August 1985

[SEAL]

*Attest:*

DONALD J. QUIGG

*Attesting Officer*    *Acting Commissioner of Patents and Trademarks*